(12) United States Patent
Krechmery et al.

(10) Patent No.: US 6,945,275 B2
(45) Date of Patent: Sep. 20, 2005

(54) AIRBAG VALVE WITH ADJUSTABLE DEAD BAND

(75) Inventors: Roger Krechmery, La Verne, CA (US); Angel Ching, Montebello, CA (US)

(73) Assignee: Barksdale, Inc., Los Angeles, CA (US)

( * ) Notice: Subject to any disclaimer, the term of this patent is extended or adjusted under 35 U.S.C. 154(b) by 5 days.

(21) Appl. No.: 10/793,586

(22) Filed: Mar. 4, 2004

(65) Prior Publication Data

US 2004/0177887 A1 Sep. 16, 2004

Related U.S. Application Data

(60) Provisional application No. 60/454,225, filed on Mar. 12, 2003.

(51) Int. Cl.[7] ............................................... F15B 13/04
(52) U.S. Cl. .............................................. 137/625.21
(58) Field of Search .................. 137/625.21; 280/124.16

(56) References Cited

U.S. PATENT DOCUMENTS

| | | |
|---|---|---|
| 5,934,320 A | 8/1999 | O'Reilly et al. |
| 6,202,992 B1 | 3/2001 | O'Reilly et al. |

*Primary Examiner*—Gerald A. Michalsky
(74) *Attorney, Agent, or Firm*—Leon D. Rosen

(57) ABSTRACT

A vehicle leveling valve for flowing pressured air to an airbag when its height falls below a predetermined height at the bottom of a height range, and for flowing air out of the airbag when its height rises above the top of the height range, which enables easy adjustment. A main valve member has a sealing surface (36) with a slot (34) therein. A disc (30) that pivots as the airbag height changes, has bores (122) that hold inserts (42, 46) with passages (40, 44). The inserts are biased against the sealing surface and have passage near ends (150) that lie adjacent to the slot ends. Each insert can pivot about a pivot axis within a disc bore (122), and each passage near end has a center (130) that is offset from the pivot axis (132a). Each insert can be pivoted about the pivot axis to shift the passage end slightly closer or further from the slot end (102) to adjust the top or bottom of the height zone.

14 Claims, 4 Drawing Sheets

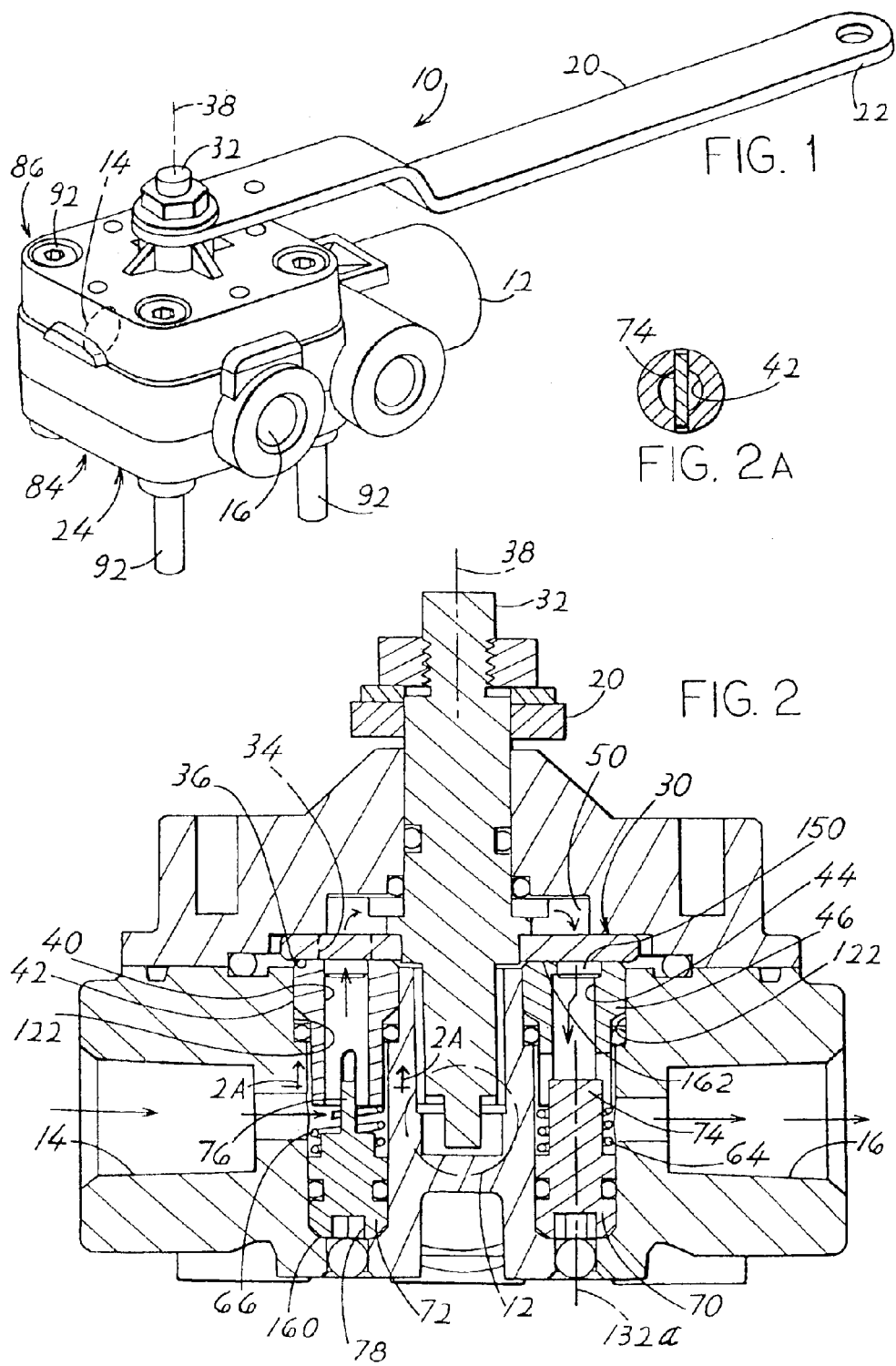

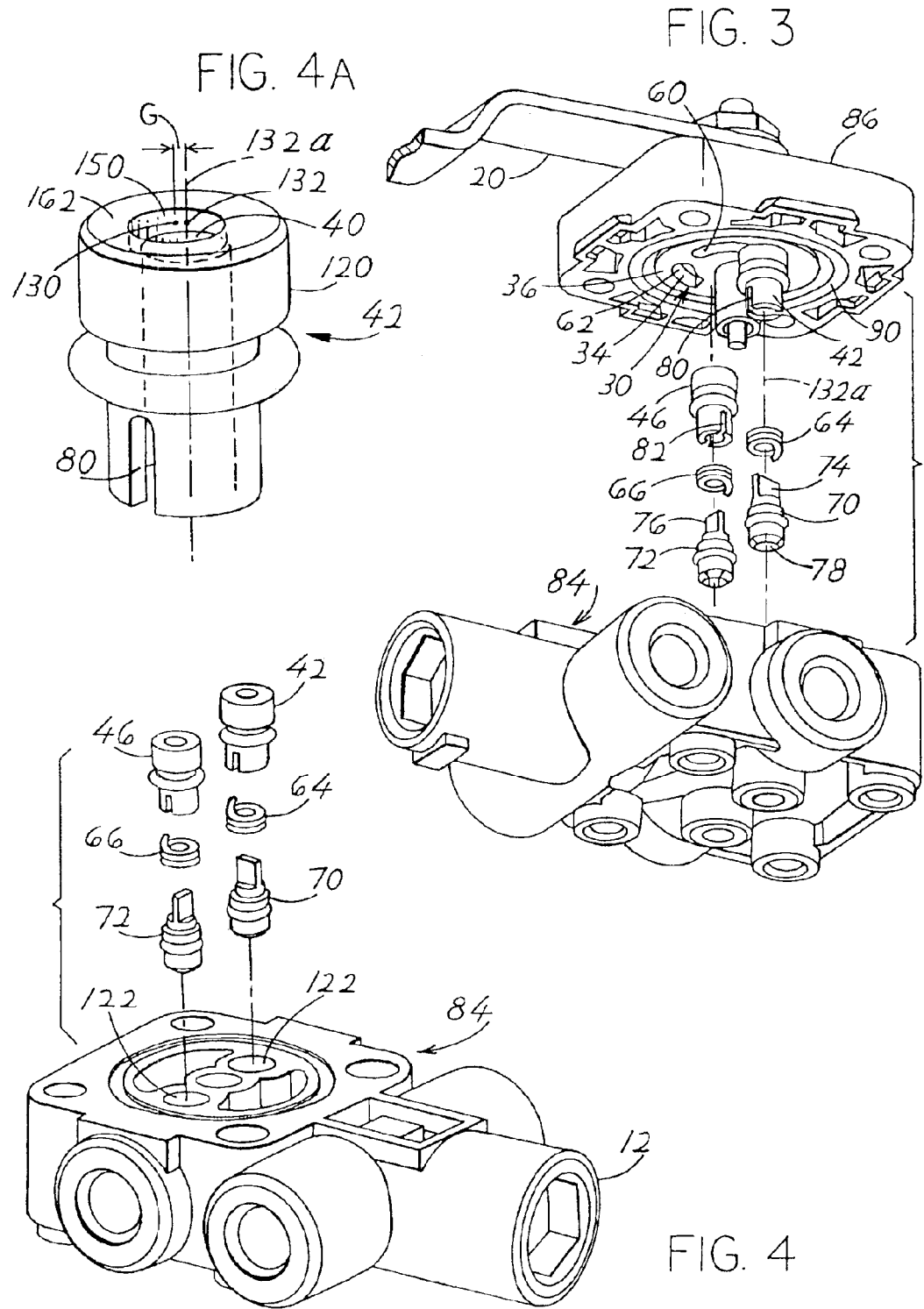

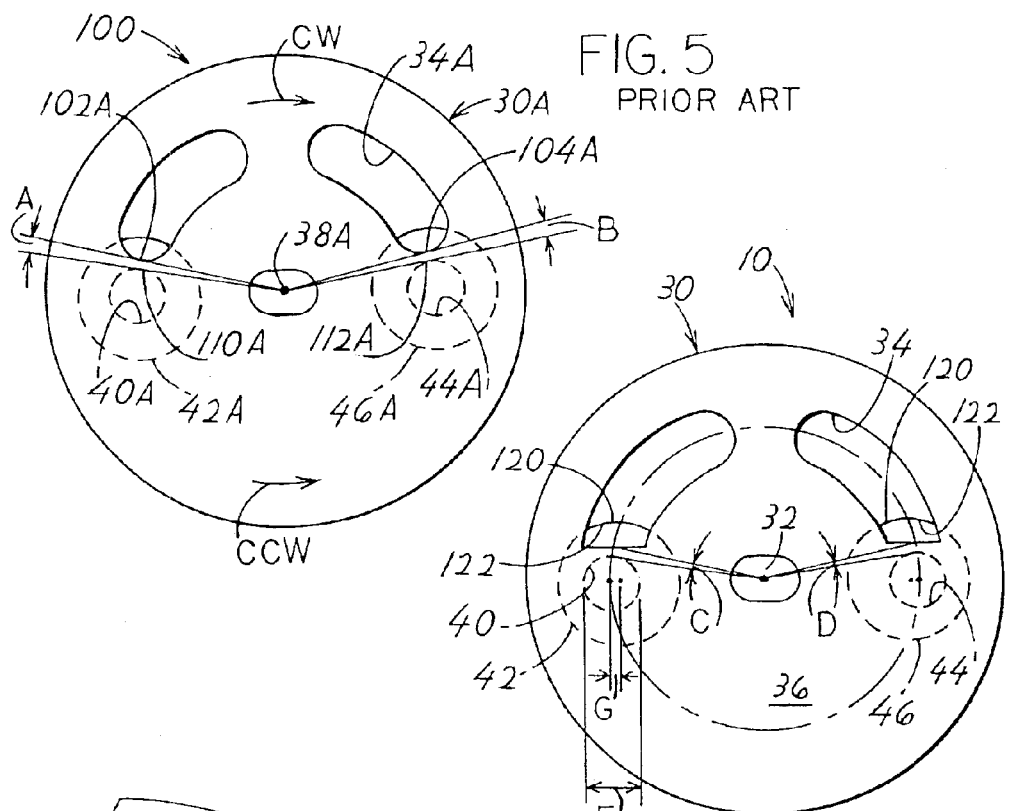
FIG. 5 PRIOR ART
FIG. 6
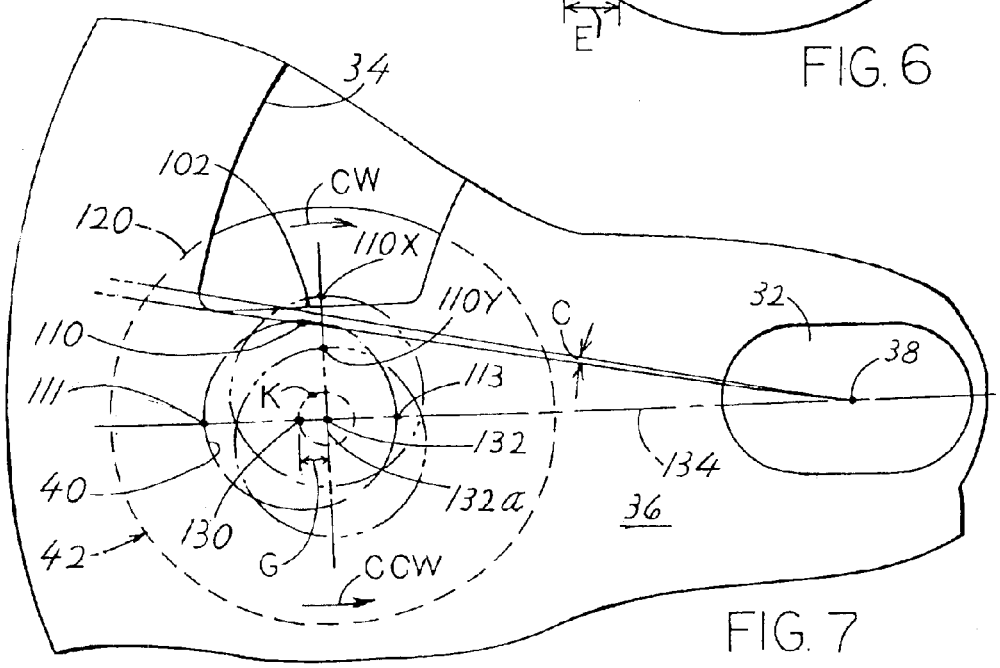
FIG. 7

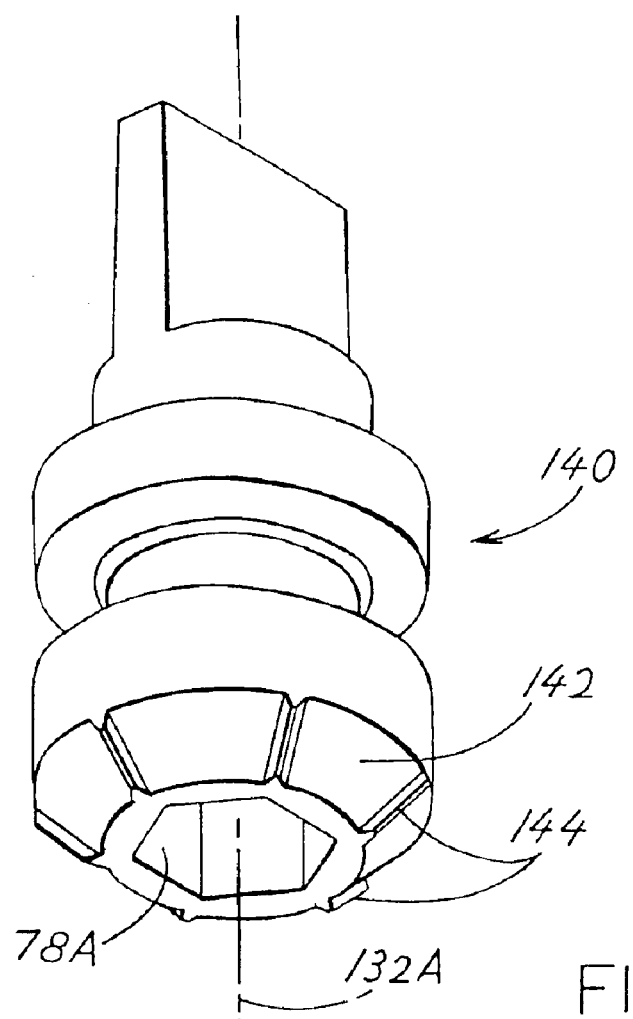
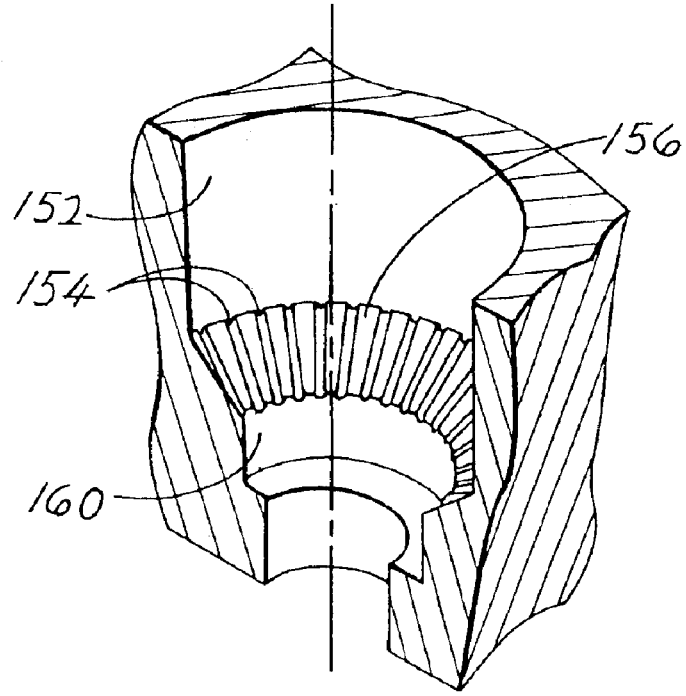
FIG. 8

AIRBAG VALVE WITH ADJUSTABLE DEAD BAND

CROSS-REFERENCE

Applicant claims priority from U.S. Provisional Patent Application Ser. No. 60/454,225 filed Mar. 12, 2003.

BACKGROUND OF THE INVENTION

Airbags are commonly used in large vehicles, as to support a vehicle cab on a chassis and to support a trailer on a frame, the airbags absorbing road shocks. A vehicle manufacturer commonly sets a predetermined optimum height for the airbag. An airbag valve, commonly referred to as a leveling valve, maintains a height close to the predetermined height. It does this by flowing air from a pressured air source to the airbag when the height falls below a predetermined height such as 5 inches for a cab airbag and 15 inches for a tractor airbag, and flowing air from the airbag into the atmosphere when the height has increased. A height zone, such as from 14.9 inches to 15.1 inches may be established within which there is no air flow into or out of the airbag. The pressured air source is commonly set at a pressure of perhaps 130 psi, and is used to operate brakes, a horn, a pneumatic seat, and other miscellaneous equipment on the vehicle. The optimum pressure of the airbag may be about 40 psi to 70 psi, the pressure varying with the load.

One type of leveling valve in widespread use is mounted on a vehicle frame and includes a disc that can pivot back and fourth as a handle inner end attached to the disc moves up and down, the handle outer end moving up and down with a vehicle axle. The disc carries inserts that are pressed tightly against a sealing surface of a main valve member that has a slot. As the disc pivots clockwise and counterclockwise, passages in the inserts move over ends of the slots to complete air paths that flow air into or out of the airbag. This type of airbag valve is described in U.S. Pat. Nos. 5,934,320 and 6,202,992.

When the disc is in its neutral position, the airbag height should be at the predetermined height (e.g. 15.0 inches). It is usually desirable that the disc pivot only a small angle such as 1.5° before the airbag is connected to one insert passage that leads to the pressured air or is connected to the other insert passage that leads to a dump (the environment). In one example, the valve handle is 8 inches long, the insert passages lie one-half inch from the disc axis, and the air is supposed to flow when the airbag height changes by about one-eighth inch. The valve parts must be maintained within close tolerances to assure that the air valve slot will not be connected to either insert passage until the disc is pivoted 1.5° in either direction from the initial, or neutral position. Accumulated tolerances in each of several different parts contribute to variations in the required disc pivot angles to connect the airbag to the pressured air source or the dump. If the accumulated tolerances are great enough, there can be a worst case scenario wherein the slot is simultaneously connected to both the pressured air source and the dump, causing continual leakage of air from the pressure source into the environment. To prevent this, the valve parts are made with high precision, resulting in increased cost; also, a greater angle than the optimum of perhaps 1.5° is often resorted to. It is noted that the pivoting of the valve in either direction before it begins a connection to the high pressure source or to the environment, is called the "dead zone" wherein no air flows into or out of the airbag.

SUMMARY OF THE INVENTION

In accordance with one embodiment of the invention, a vehicle leveling valve is provided, of the type that has a moveable member such as a disc, with bores that receive inserts with passages and with insert near ends that are biased against a sealing surface of a stationary valve member. When the moveable member moves, the insert near ends move over a slot in the sealing surface to allow air to flow into or out of an airbag. The present invention provides a simple and low cost way to adjust the dead zone along which the moveable member moves. Each insert is pivotable about a pivot axis within a corresponding bore in the moveable member, and each insert passage near end is offset from the corresponding pivot axis. As a result, each insert can be turned to shift the passage near end toward or away from the slot. Each slot has a slot end lying adjacent to an insert passage, the slot end being primarily straight and extending primarily circumferential to the adjacent insert pivot axis.

Each bore holds an adjuster that has a far end that can be turned by a wrench or other turning tool to turn the corresponding insert. A spring in each moveable member bore biases the insert near end firmly against the sealing surface, and biases the adjuster against an internal flange at the far end of the bore. Each adjuster has a narrow blade that passes through the spring and engages a slot in the insert to turn the insert. The blade occupies less that half the cross-sectional area within the insert passage to allow air to flow through the passage.

The novel features of the invention are set forth with particularity in the appended claims. The invention will be best understood from the following description when read in conjunction with the accompanying drawings.

BRIEF DESCRIPTION OF THE DRAWINGS

FIG. 1 is an isometric view of a leveling valve constructed in accordance with one embodiment of the invention.

FIG. 2 is a sectional view of the valve of FIG. 1.

FIG. 2A is a partial sectional view taken on line 2A—2A of FIG. 2.

FIG. 3 is an exploded isometric view taken from the bottom, or far end of the valve of the FIG. 1.

FIG. 4 is an exploded isometric view similar to that of FIG. 3, but taken from the top, or near end of the valve, and without the valve top.

FIG. 4A is an enlarged isometric view of one of the inserts of the valve of FIG. 4.

FIG. 5 is a plan view of the sealing surface of a prior art leveling valve, and showing in phantom lines, two inserts in the disc moving member.

FIG. 6 is a plan view of the sealing surface of the valve of FIG. 2, and showing in phantom lines, the two inserts of the disc.

FIG. 7 is an enlarged view of a portion of the sealing surface and an insert, of FIG. 6, the insert being shown in phantom lines.

FIG. 8 is an isometric exploded and partially sectional view of an adjustable airbag valve of another embodiment of the invention.

DESCRIPTION OF THE PREFERRED EMBODIMENTS

FIG. 1 illustrates an airbag valve assembly 10 of the present invention, which has a port 12 connected to a vehicle airbag, a port 14 that is connected to a pressured air source (e.g. 130 psi) and a port 16 that is connected to the environment and which is sometimes referred to as a dump through which air is disposed of. An actuator in the form of a handle 20 controls the valve. The actuator 20 can have an end 22 connected to one end of the airbag such as the lower end that is mounted on a vehicle axle, while the valve 24 is coupled to the opposite end of the airbag such as to a chassis that is supported by the airbag. As the chassis moves up and down, the handle 22 pivots a shaft 32 of the valve 24, and operates the valve.

FIG. 2 shows that the valve includes a moveable member in the form of a disc 30 that is fixed to the shaft 32 and that pivots with it about a disc axis 38. The disc 30 has a sealing surface 36 with a slot 34 that can be connected to a passage 40 in a high pressure air insert 42, or that can be connected to a passage 44 in a dump insert 46. An area 50 above the disc is continually connected to the airbag.

FIG. 3 shows that the disc 30 that is pivoted by the actuator handle, has an interrupted slot 34 with two slot portions 60, 62. The inserts 42, 46 are pressed upwardly towards the disc by a pair of springs 64, 66. A pair of adjusters 70, 72 have screwdriver-like blades 74, 76 that lie in corresponding slots 80, 82 of the inserts to turn them, for reasons that will be described later herein. Each adjuster has a tool receiver in the form of an hexagonal socket 78 for receiving a turning tool such as a hex wrench for turning it. FIG. 4 shows that the inserts 42, 46, springs 64, 66, and adjusters 70, 72 are received in bores 122 of the valve body 84 which is a stationary member. FIG. 3 shows a valve top 86 which lies over the valve body 84 and an O-ring 90 that forms a seal between them. Screws 92 (FIG. 1) clamp the valve top 86 to the valve body.

FIG. 5 shows a portion of a prior art valve which is similar to the present valve. The prior art valve 100 includes a disc 30A with an interrupted slot 34A and a pair of valve inserts 42A, 46A with insert passages 40A and 44A. Ideally, proximal, ends 102A, 104A of the slot were positioned about the disc axis 38A to lie at angles A, B from adjacent locations 110A, 112A of the insert passages, so each angle has a value such as 1.5° in the initial disc position illustrated in FIG. 5. Pivoting of the disc 30A by 1.5° in the clockwise CW or counterclockwise CCW directions connected the airbag to the dump or to the high pressure source. There was a "dead band" (A+B) of ±1.5°, within which the disc could pivot without any connection of the slot 34A to either insert passage.

In practice, the actual position of the disc relative to the insert passages depends upon an accumulation of tolerances. In order to maintain the dead zone A+B very close to ±1.5°, requires very tight tolerances of parts, which increases the cost of manufacture of the air valve. Variations in the ideal angles A, B can be undesirable. Angles A, B appreciably greater than the ideal (e.g. 1.5°) may result in a constant airbag height considerably more or less than the optimum airbag height, resulting in a bumpy or otherwise poor ride. An angle A or B substantially less than optimum (e.g. 1.5°) may cause very frequent airbag filling or emptying which wastes pressured air and which may cause the airbag to remain at a height other than optimum. Even more harmful, one or both angles considerably less than 1.5° may even cause continual drain of pressured air through the valve to the atmosphere.

FIG. 6 shows a portion of the airbag valve 10 of the present invention, wherein the inserts 42, 46 are constructed with passages 40, 44, wherein at least the near end of each passage 40, 44 (the end that lies closest to the sealing surface 36) is offset from the centers of the cylindrical periphery 120 of the corresponding insert, and from the center of the cylindrical hole or bore 122 in which that insert lies. The offset distance G is small, but sufficient to enable adjustment of the dead band angles C, D. FIG. 7 shows that in an initial position of the insert 42, the center 130 of the insert passage 40 (at least the top, or near part of it) is spaced from the center 132. The insert center 132 is the center of the periphery or outside 120 of the insert, while the passage center 130 is the center of the periphery of the passage near end. The center 132 lies on a pivot axis 132a which extends normal (perpendicular) to the sealing surface and to the insert face. The spacing G is in a direction radial to the axis 38 of the shaft and disc (i.e. the spacing is along a radial line 134), and parallel to the primarily straight proximal end 102 of the disc slot. Accordingly, one-half of the dead band angle remains at the angle C. However, if the insert is turned 90° in a clockwise direction CW from the initial position, the adjacent location 110 (location closest to the slot end 102) of the insert passage moves from 110 to the position 110X (a point on the passage moves from 111 to 110X) wherein the passage extends beyond the proximal end 102 of the slot. Similarly, if the insert is rotated 90° in the counterclockwise direction CCW from the initial position, the proximal end 110 of the insert passage is moved to the position 110Y (a point at 113 is moved to 110Y) wherein the passage is spaced much further from the proximal end 102 of the disc slot. Applicant notes that the insert passage 40 has a diameter E (FIG. 6) that is a plurality of times the offset G, so substantially the full insert passage end is connected to the slot during the first fillup of the airbag.

Applicant can construct the valve, so that in the initial position of the insert 42, it lies in the initial position wherein its passage center 130 (FIG. 7) is spaced from the center 132 of the insert periphery, in a direction radial to the shaft axis 38. The slot end 102 is primarily straight (a radius of curvature more than twice the width of the slot 34). Applicant then tests the valve to determine the required angle of the valve handle away from its initial position, required before high pressure air applied to the high pressure port (14 in FIG. 2) begins to flow into the airbag port 12 that is normally connected to the airbag. Applicant then turns the insert 42 until it lies at the desired angle from the initial handle position (e.g. 1.5°) before such connection of the high pressure port to the airbag port will begin to be made. For a given offset G and other dimensions, a predetermined large insert pivoting (about 45°) from the angle of beginning of leakage, can produce the desired 1.5° angle. A similar test and turning of the other valve insert 46 is performed so the dead band angles C, D of FIG. 6 are each at the desired angles. The adjustments of the valve inserts 42, 46 are made to select the center of the dead band. The center of the dead band can be set to coincide with the mechanical centerline of the valve (when the valve handle end 22 is at the desired height), but can be set to any desired position.

In actuality, applicant prefers that in the initial position of the valve, with the airbag height halfway between the extremes (e.g. at 15.0 inches which is halfway between 14.9 inch and 15.1 inch positions at which air starts flowing), the center 130 of the passage lies at point K (FIG. 7) which is 45° from position 130. Also, applicant may place stops that prevent insert pivoting more than predetermined angles such as ±45° from an initial position such as where the passage near end center lies at K.

FIG. 3 shows that each insert such as 42 can be turned by a technician inserting a hex wrench into the hex socket 78 of a corresponding adjuster. The blade 74 of the adjuster lies in the slot 80 of the insert so turning of the adjuster causes turning of the insert. FIG. 2 shows that the adjuster hex socket 78 is accessible from the bottom (far end) of the valve, and can be used to turn the corresponding insert 42. The figure also shows that the other insert 46 has a passage 44 with an insert passage near end 150 which is the only portion offset from the axis of the insert periphery. This has the advantage that most of the passage 44 is concentric with the disc bore 122, so the walls of passage 44 are largely uniform and strong for a bore 122 and passage 44 of given diameters.

FIG. 2 shows that each bore has a far end that forms an internal flange 160. Each spring 64, 66 presses the corresponding adjuster 70, 72 with considerable force against the flange, and presses the face 162 of the corresponding insert with considerable force against the sealed surface, which prevents both the insert and the adjuster from turning unless forced to turn. Blades 74, 76 are used to connect a part of each adjuster to an insert. As shown in FIG. 2A, each blade such as 74 occupies less than half the cross-sectional area within the corresponding insert passage 42. This allows air to flow rapidly through the passage, with minimum obstruction.

In one valve that applicant has designed, the distance between the disc axis 38 (FIG. 7) and insert pivot axis 132 is 10.3 mm. The center 130 of each passage near end was offset a distance G of 0.25 mm from the insert pivot axis 132. This results in a maximum change in angle C of ±1.5° from the neutral position of the center at 130. Most of valve parts were of steel, but the inserts were of ceramic to reduce wear.

FIG. 8 illustrates a modified adjuster 140 with a far end surface 142 that has adjuster projections 144. The flange 160 in the far portion of the bore 152 of the main valve part has recesses 154 that each can receive one of the adjuster projections. To turn the adjuster, a person inserts a hex wrench into the hex socket 78A and pushes upward with sufficient force to overcome the force of the spring. With the adjuster pushed upward, the wrench is turned, and is then released. The projections usually will fall into recesses (or can turn by only a small angle before falling into the recesses), which then prevents the adjuster from turning.

In FIG. 8, applicant forms the projections 144 and recesses 154 in conical surfaces 142, 156 of the adjuster and bore walls, which helps center the adjuster in the bore. The projections and recesses extend toward the pivot axis 132A. When the projections lie in the recesses, the downward, or far force of the adjuster conical surface 142 is supported by the conical surface 156 of the bore walls. The conical surfaces can be easily formed to provide wide area contact.

In the arrangement shown in FIG. 8 that applicants have designed, the adjuster had six projections angled 60° apart about the axis 132A. The tapered bore wall had seventy-two recesses 154 angled 5° apart. An angle between 5° and 20° is preferred, and any angle that can divide 360° and yield a whole number can be used.

Although applicant has shown and described an insert-holding moving member in the form of a disc, it should be understood that other valve constructions can be used such as one with a linearly sliding moving member. However, the same principles of an insert passage that is offset from a pivot axis of a bore that receives the insert passage, can be applied.

Thus, the invention provides an airbag valve with the dead band angles at opposite ends of the interrupted slot in the disc, being adjustable. This is accomplished by forming at least the near end of each insert passage which lies adjacent to the sealing surface, so the center of the passage near end is offset from the center of the periphery of the disc or other part about which the disc is rotatable. Each insert can be turned about its axis of pivoting, to adjust the corresponding dead band angle. This allows a precise setting of each dead band angle, while also allowing the airbag valve parts to be constructed with greater tolerances. The inserts and adjusters can be installed in prior art valves of the type illustrated in FIG. 5 as retrofits.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A vehicle leveling valve for passing pressured air from a pressured air source to a vehicle airbag to fill it, and for releasing air from the airbag to empty it, the valve including a stationary valve member and a moveable member, a first of said members having a sealing surface and a slot therein that is connected to said airbag, and a second of said members includes a pair of insert bores and a pair of inserts that each lies in one of said insert bores, each insert having a face that presses against the sealing surface of said first member and each insert having an insert passage with an insert passage near end that lies at the insert face at a location adjacent to one of said slots wherein:

each of said inserts is pivotable about a pivot axis that extends through a corresponding one of said insert bores, each pivot axis extending normal to said seal surface, and the passage near end of each of said inserts has a center that is offset from the corresponding insert pivot axis, whereby to enable shifting of the passage near end closer or further from the slot by pivoting the insert about its pivot axis.

2. The valve described in claim 1 including:

a pair of adjustors, each lying in one of said insert bores, each adjustor having a tool-engaging far end for manual turning by a turning tool and each adjuster having a near end that is rotatably engaged with one of said inserts to turn it, but each insert being slideable along its pivot axis independently of the corresponding adjustor;

a pair of springs, each biasing one of said inserts toward said seal surface and biasing a corresponding one of said adjustors away from said seal surface, said stationary valve member limiting adjuster movement away from said seal surface.

3. The valve described in claim 2 wherein:

said stationary valve member has a source port and a dump port, leading respectively to said pressure source and to the environment;

each adjustor and corresponding insert are constructed so each has a turning connector engaged with the other turning connector so the adjuster can turn the insert, each of said connectors having a connector portion lying in one of said insert passages and blocking less than half of the cross-sectional area of that insert passage.

4. The valve described in claim 2 wherein:

the near end of each adjustor forms a screwdriver blade and each insert has a slot with slot portions on opposite sides of the insert passage that each receives the blade, each blade blocking no more than half the cross-sectional area of the corresponding passage.

5. The valve described in claim 2 wherein:

each of said adjusters and corresponding walls of each of said bores, are constructed with one having projections and the other having recesses that receive the projections, at any of a plurality of angular positions of the adjuster about its pivot axis, each projection moving out of a recess when the adjuster is moved a distance toward said seal surface so the adjuster can be turned.

6. The valve described in claim 1 wherein:

said moveable valve member is a disc that pivots about a disc axis;

each of said insert passages has a primarily circular passage near end with a passage near end center that is offset from the corresponding pivot axis to shift by an angle of between 0.5° and 5° with respect to said disc axis from a neutral position wherein said passage near end center lies on an imaginary line that radiates from said disc axis and that passes through said pivot axis, as the insert pivots about its axis by 90° from said neutral position.

7. The valve described in claim 1 wherein:

each of said insert passages shifts toward and away from the slot by between 0.2 mm and 2 mm as the insert pivots about its pivot axis by 90° from a neutral position wherein the near end of each of said insert passages is spaced from slot by half of the maximum distance of the near end from the slot.

8. The valve described in claim 1 wherein said slot has opposite ends and each insert passage end lies adjacent to a different one of said slot ends, and wherein:

each of said slot ends is primarily straight and has a middle that extends approximately circumferential to the pivot axis of the adjacent insert.

9. The valve described in claim 1 wherein:

each of said insert passages has a cylindrical insert passage near end portion that extends to said insert face, and each insert passage has a cylindrical insert passage portion that extends away from said near end portion and that is offset from said passage near end portion and that has an axis that is coincident with the corresponding insert pivot axis.

10. A vehicle leveling valve with a pressured air port, a dump port, and an airbag port, for passing pressured air from said pressured air port to said airbag port to fill an airbag, and for releasing air from the airbag port to the dump port to empty the airbag, the valve having a main valve member and a disc that pivots about a disc axis on the main valve member, the disc having a seal face and having a slot therein that is connected to said airbag, said main valve member having a pair of insert-receiving bores and having a pair of inserts each lying in one of said insert-receiving bores and having an insert face biased against said seal face of said disc, each insert having an insert passage with an insert passage near end that lies at the insert face at a location adjacent to said slot, wherein:

each insert is pivotable within one of said insert receiving bores about a pivot axis that is normal to the insert face, in opposite directions from an initial position;

each of said insert passage near ends is offset from the corresponding insert pivot axis, sufficiently that the center of the insert passage near end moves by at least 0.1° about said disc axis towards and away from an adjacent location of said slot as said insert turns in either one of two opposite directions from said initial position to produce maximum movement of the center of the insert passage near end with respect to the slot.

11. The valve described in claim 10 including:

a pair of adjustors that each lies in one of said bores, each bore having a far end lying opposite the face of the main valve member, the main valve member having an internal flange at the far end of the bore that traps the adjustor in the bore;

each insert has a far end that can be turned;

each adjustor has a far end that can be manually turned by a tool, and each adjustor having a near end with a turning part that engages the far end of the corresponding insert to turn it; and a pair of coil springs that each biases apart one of said inserts and one of said adjustors.

12. The valve described in claim 11 wherein:

each of said insert passages has a cylindrical insert passage near end portion that extends to said insert face, and each insert passage has a cylindrical insert passage far end portion that extends away from said passage near end portion and that is offset from said passage near end portion.

13. The valve described in claim 11 wherein:

said slot has opposite ends that each lies adjacent to one of said insert ends, each slot end extending primarily straight and having a slot middle extending approximately perpendicular to an imaginary line extending between the adjacent pivot axis and said slot middle.

14. The valve described in claim 11 wherein:

each adjuster has an adjuster wall that engages one of said external flanges;

one of said walls has a plurality of recesses and the other has at least one projection that is receivable in one of said recesses at different rotational positions of the adjuster about its pivot axis.

* * * * *